United States Patent
Debois et al.

(10) Patent No.: US 10,693,645 B2
(45) Date of Patent: Jun. 23, 2020

(54) SECURITY MANAGEMENT SYSTEM FOR PERFORMING A SECURE TRANSMISSION OF DATA FROM A TOKEN TO A SERVICE PROVIDER SERVER BY MEANS OF AN IDENTITY PROVIDER SERVER

(71) Applicant: GEMALTO SA, Meudon (FR)

(72) Inventors: Georges Debois, Meudon (FR); Aline Gouget, Meudon (FR); Michael Webster, Meudon (FR)

(73) Assignee: Thales Dis France SA, Meudon (FR)

( * ) Notice: Subject to any disclaimer, the term of this patent is extended or adjusted under 35 U.S.C. 154(b) by 178 days.

(21) Appl. No.: 15/744,402

(22) PCT Filed: Jul. 13, 2016

(86) PCT No.: PCT/EP2016/066661
§ 371 (c)(1),
(2) Date: Jan. 12, 2018

(87) PCT Pub. No.: WO2017/009378
PCT Pub. Date: Jan. 19, 2017

(65) Prior Publication Data
US 2018/0219679 A1    Aug. 2, 2018

(30) Foreign Application Priority Data

Jul. 13, 2015 (EP) .................................. 15306158

(51) Int. Cl.
*H04L 9/32* (2006.01)
*H04L 29/06* (2006.01)

(52) U.S. Cl.
CPC ............ *H04L 9/3213* (2013.01); *H04L 9/321* (2013.01); *H04L 9/3234* (2013.01);
(Continued)

(58) Field of Classification Search
CPC . H04L 9/3213; H04L 9/3263; H04L 63/0442; H04L 63/0435; H04L 9/3234; H04L 9/321
See application file for complete search history.

(56) References Cited

U.S. PATENT DOCUMENTS 7,039,802 B1 * 5/2006 Eskicioglu .......... H04L 63/0823
380/255
2013/0318354 A1 * 11/2013 Entschew ............. G06F 21/645
713/175
(Continued)

FOREIGN PATENT DOCUMENTS

EP        2 533 486 A1 *  6/2011  ............. H04L 29/06
WO   WO 2015/035396 A9 *  3/2015  ............... H04L 9/32

OTHER PUBLICATIONS

Jan Eichholz, et al: "SAMLizing the European Citizen Card", (Sep. 17, 2009), XP055239960, Retrieved from the Internet: URL:https://www.researchgate.net/profile/Jan_Eichholz/publication/221234819_SAMLizing_the_European_Citizen_Card/links/02e7e528c8ba7a3443000000.pdf [retrieved on Jan. 11, 2016] sections 3.3 and 3.4; figure 6.
(Continued)

*Primary Examiner* — Christopher A Revak
(74) *Attorney, Agent, or Firm* — The Jansson Firm; Pehr B. Jansson

(57) ABSTRACT

The present invention relates to a security management system for performing a secure transmission of data from a token to a service provider server by means of an identity provider server, wherein said security management system comprises: —said identity provider server which is adapted to: —open with said token a secure messaging channel by means of a General Authentication Procedure using at least one certificate; —receive via said secure messaging channel from said token enciphered data; —transmit to said service
(Continued)

provider server said enciphered data; —said service provider server which is adapted to: —receive from said identity provider server enciphered data of said token; —decipher said enciphered data to extract said data; —said token which is adapted to: —encipher data; and—transmit via said secure messaging channel to said identity provider server said enciphered data.

12 Claims, 6 Drawing Sheets

(52) U.S. Cl.
CPC ........ *H04L 9/3263* (2013.01); *H04L 63/0435* (2013.01); *H04L 63/0442* (2013.01)

(56) References Cited

U.S. PATENT DOCUMENTS

| | | | | |
|---|---|---|---|---|
| 2015/0074407 | A1* | 3/2015 | Palmeri | H04L 63/0807 713/171 |
| 2015/0095999 | A1* | 4/2015 | Toth | H04L 63/08 726/6 |
| 2016/0134599 | A1* | 5/2016 | Ross | H04L 63/08 713/168 |
| 2017/0171189 | A1* | 6/2017 | Byszio | H04L 63/0815 |
| 2018/0302227 | A1* | 10/2018 | Seegebarth | G06F 21/43 |

OTHER PUBLICATIONS

Bjones Ronny et al: "Integrating Anonymous Credentials with eIDs for Privacy-Respecting Online Authentication", (Oct. 10, 2012), Grid and Cooperative Computing—GCC 2004 : Third International Conference, Wuhan, China, Oct. 21-24, 2004 In: Lecture Notes in Computer Science , ISSN 302-9743 ; vol. 3251; [Lecture Notes in Computer Science , ISSN 1611-3349], Springer Verlag,, XP047265617, ISSN: 0302-9743 ISBN: 978-3-642-24711-8 section 2.1; figure 1.

"Architecture electronic Identity Card and electronic ResidentPermit", (Mar. 10, 2011), XP055239800, Retrieved from the Internet: URL:https://ww.bsi.bund.de/SharedDocs/Downloads/EN/BSI/Publications/TechGuidelines/TR03127/BSI-TR-03127_en.pdf?_blob=publicationFile [retrieved on Jan. 8, 2016] the whole document.

"Advanced Security Mechanisms for Machine Readable Travel Documents and eIDAS Token-", (Feb. 3, 2015), XP055239778, Retrieved from the Internet: URL:https://www.bsi.bund.de/SharedDocs/Downloads/EN/BSI/Publications/TechGuidelines/TR03110/BSI_TR-03110_Part-2-V2_2.pdf?_blob=publicationFile&v=1 [retrieved on Jan. 8, 2016] the whole document.

PCT/EP2016/06661, International Search Report, dated Oct. 10, 2016, European Patent Office, P.B. Patentlaan 2 NL—2280 HV Rijswijk.

PCT/EP2016/06661, Written Opinion of the International Searching Authority, dated Oct. 10, 2016, European Patent Office, D-80298 Munich.

* cited by examiner

SECURITY MANAGEMENT SYSTEM FOR PERFORMING A SECURE TRANSMISSION OF DATA FROM A TOKEN TO A SERVICE PROVIDER SERVER BY MEANS OF AN IDENTITY PROVIDER SERVER

TECHNICAL FIELD

The present invention relates to a security management system for performing a secure transmission of data from a token to a service provider server, said service provider server being adapted to propose a service to said token. The invention also relates to an associated method.

Such a security management system may be used in a non-limitative example in any system which needs delegation of authentication between a token and a service provider server by means of an identity provider server while protecting the privacy of a token's end-user.

BACKGROUND OF THE INVENTION

For performing a secure transmission of data from a token to a service provider server, authentication mechanism such as the "General Authentication Procedure" ensures privacy of a token's end-user, but may be difficult to deploy for a service provider server. To simplify such deployment, a service provider server may delegate authentication to an identity provider server, which will perform the authentication on its behalf. However, one problem of this prior art is that in this case the identity provider server is a hotspot for data read from the token, as many service provider servers may delegate authentication to this identity provider server. Such data may be linked together, which could compromise the end-user's privacy.

SUMMARY OF THE INVENTION

It is an object of the invention to provide a security management system for performing a secure transmission of data from a token to a service provider server, and which permits to ensure the privacy of the token's end-user.

To this end, there is provided a security management system for performing a secure transmission of data from a token to a service provider server by means of an identity provider server, wherein said security management system comprises:
said identity provider server which is adapted to:
  open with said token a secure messaging channel by means of a General Authentication Procedure using at least one certificate;
  receive via said secure messaging channel from said token enciphered data;
  transmit to said service provider server said enciphered data;
said service provider server which is adapted to:
  receive from said identity provider server enciphered data of said token;
  decipher said enciphered data to extract said data;
said token which is adapted to:
  encipher data; and
  transmit via said secure messaging channel to said identity provider server said enciphered data.

According to non-limitative embodiments of the invention, the security management system in accordance with the invention further comprises the following characteristics.

In a non-limitative embodiment, said enciphered data further comprise token's attributes.

In a non-limitative embodiment, said service provider server is further adapted to transmit to said identity provider server a service provider server certificate.

In a non-limitative embodiment, for opening a secure messaging channel:
  said identity provider server is further adapted to transmit to said token said at least one certificate; and
  said token is further adapted to check said at least one certificate received from said identity provider server.

In a non-limitative embodiment, said at least one certificate is a service provider server certificate and comprises:
  access permissions and role of said service provider server; and
  a sector public key.

In a non-limitative embodiment, said service provider server certificate further comprises an authentication public key corresponding to an authentication private key for use to perform a Terminal authentication.

In a non-limitative embodiment, said at least one certificate is an identity provider server certificate and comprises:
  access permissions and role of said identity provider server.

In a non-limitative embodiment, said identity provider server certificate further comprises an authentication public key corresponding to an authentication private key for use to perform a Terminal authentication.

In a non-limitative embodiment, said token is further adapted to generate at least one pseudonym and said enciphered data comprise said at least one pseudonym.

In a non-limitative embodiment, the enciphering and the deciphering of said data is performed using an asymmetric scheme.

In a non-limitative embodiment,
  said service provider server certificate further comprises a public encipher key;
  the enciphering of data by said token is performed using said public encipher key;
  the deciphering of said enciphered data by said service provider server is performed using a private encipher key corresponding to said public encipher key.

In a non-limitative embodiment, the enciphering and the deciphering of said data is performed using a symmetric scheme.

In a non-limitative embodiment,
  the token further comprises a secret key;
  the service provider server further comprises a first secret data and a second secret data which is the result of the ciphering of said first secret data with said secret key;
  the service provider server certificate further comprises said second secret data; and wherein:
  the token is further adapted to extract from said service provider server certificate said first secret data, said extraction being based on the deciphering of said second secret data using said secret key;
  the enciphering of data by said token is performed using as a ciphering key said first secret data or a derived key from said first secret data;
  the deciphering of said enciphered data by said service provider server is performed using as a deciphering key said first secret data or said derived key.

In a non-limitative embodiment, said token is a secure element.

In addition, there is provided a method for performing a transmission of data from a token to a service provider server by means of an identity provider server, wherein said method comprises:

opening with said token by means of said identity provider server a secure messaging channel by means of a General Authentication Procedure using at least one certificate;

enciphering by means of said token data and transmitting via said secure messaging channel to said identity provider server said enciphered data;

receiving from said token via said secure messaging channel by means of said identity provider server said enciphered data;

transmitting to said service provider server by means of said identity provider server said enciphered data;

receiving from said identity provider server by means of said service provider server said enciphered data of said token;

deciphering by means of said service provider server said enciphered data to extract said data.

In addition, there is provided an identity provider server which is adapted to securely transmit data from a token to a service provider server, wherein said identity provider server is adapted to:

open with said token a secure messaging channel by means of a General Authentication Procedure using at least one certificate;

receive via said secure messaging channel from said token enciphered data; and transmit to said service provider server said enciphered data.

In addition, there is provided a token which is adapted to securely communicate with a service provider server by means of an identity provider server, wherein said token is adapted to:

use a secure messaging channel which is open with said identity provider server by means of a General Authentication Procedure using at least one certificate;

encipher data; and transmit via said secure messaging channel to said identity provider server said enciphered data for said service provider server.

BRIEF DESCRIPTION OF THE FIGURES

Some embodiments of methods and/or apparatus in accordance with embodiments of the present invention are now described, by way of example only, and with reference to the accompanying drawings, in which.

DESCRIPTION OF EMBODIMENTS OF THE INVENTION

In the following description, well-known functions or constructions by the man skilled in the art are not described in detail since they would obscure the invention in unnecessary detail.

The present invention relates to a security management system SYS.

As will be described hereinafter, the security management system SYS permits an identity provider server IDP to perform the General Authentication Procedure referred as GAP on behalf of the service provider server SP, while maintaining the end-user's privacy and the end-user's anonymity. Hence, the GAP provides a strong authentication between the token D and the identity provider server IDP.

The GAP, which is well known by the man skilled in the art and is described in the Technical Guideline BSI-TR-03110—part 2 published by the Federal Office For Information Security, comprises:

the PACE protocol which serves to establish an encrypted and integrity-secured channel SI between a local terminal connected to the token D and said token D;

the Terminal authentication referred as TA2 which is an authentication of a service provider server by the token D and which serves to prove the access permissions of a service provider server to the data stored in the token D;

the Chip authentication referred as CA2 or CA3 which is an authentication of the token D by a service provider server.

It is to be reminded that the CA3 authentication, which is well-known by the man skilled in the art, is a Chip authentication with a transferable proof and which comprises a pseudonym generation.

When the entire GAP is successfully performed, a secure messaging channel SM is open (or established) and the first session keys (described later) are available to use said secure messaging channel SM.

In the following, the term secure messaging channel SM or the term SM channel will be used indifferently.

Figure 1:
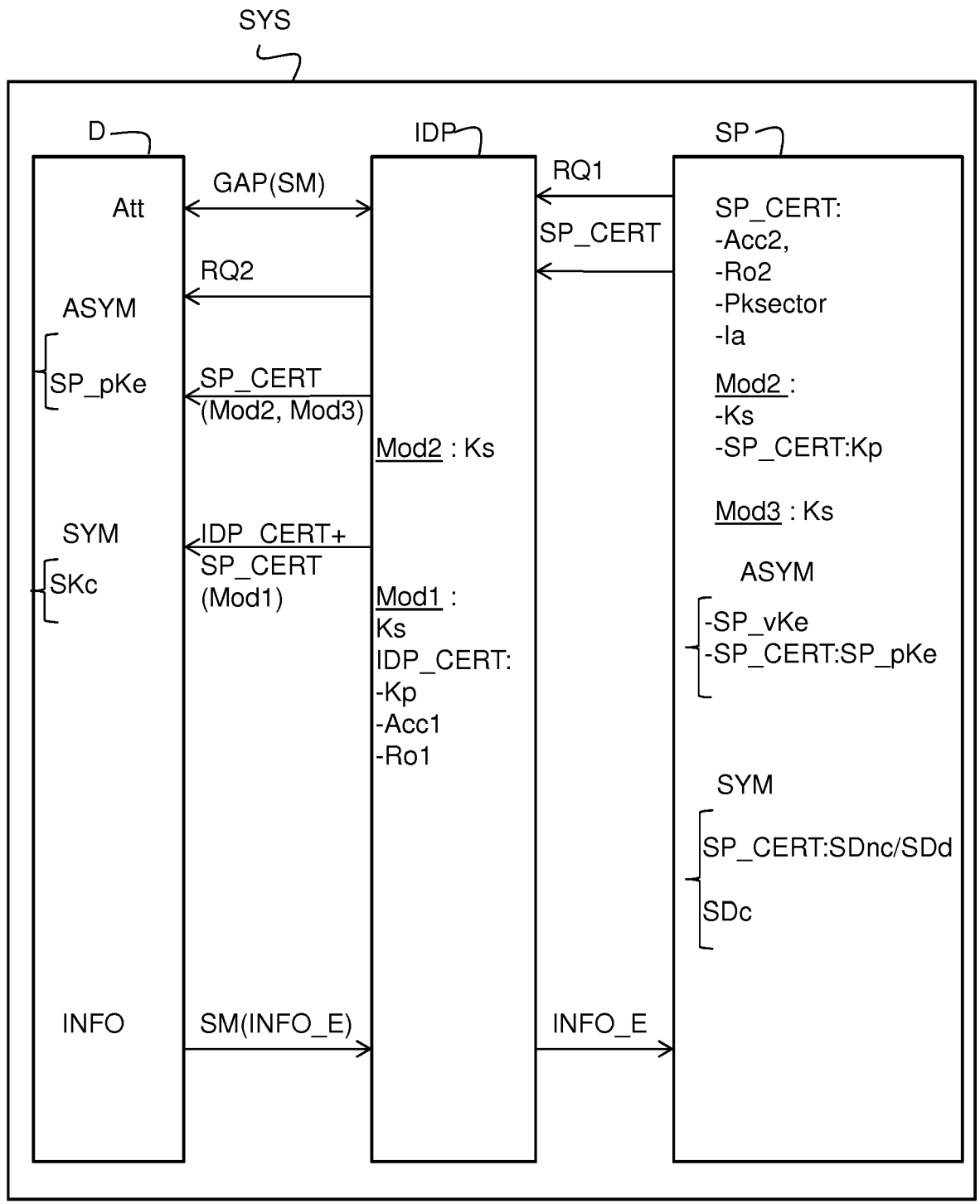
FIG. 1 illustrates schematically a security management system according to a non-limitative embodiment of the invention.

Said security management system SYS is illustrated in FIG. 1 in a non-limitative embodiment. It comprises:

an identity provider server IDP;
a service provider server SP;
a token D.

Usually, the identity provider server IDP and the service provider server SP are remote servers to the token D.

In the following, the term identity provider server IDP or the term IDP server will be used indifferently. In the same manner, the term service provider server SP or the term SP server will be used indifferently Of course, said security management system SYS may comprise a plurality of service provider servers SP and a plurality of token D.

As described hereinafter, the IDP server opens a secure messaging channel SM with the token D so that it will securely pass data from the token D to the SP server. The IDP server will use a certificate to open the SM channel with the token D as will be described in the following.

The different elements of the security management system SYS are described in more detail in the following.

The token D is described with reference to FIGS. 1 and 2;
the service provider server SP is described with reference to FIGS. 1 and 3, and the identity provider server IDP is described with reference to FIGS. 1 and 4.

The token.

In a non-limitative embodiment, a token D is a secure element.

A secure element is a secured component which may perform cryptographic functionalities and is adapted to store secret information.

In non-limitative examples, the token D is an Electronic Identity Card, is a health card, a driving license, a passport, a privacy card, a financial service card, an access card etc. It may be contact or contactless.

In a non-limitative variant, the token D is a smart card.

In other non-limitative variants, the token D is an eSE (embedded secure element), a micro-SD, a soldered element, a M2M module etc.

Said token D comprises a plurality of attributes Att.

In non-limitative examples, said attributes Att are:
the name of the token's end-user;
the address of the token's end-user;
the age of the token's end-user;
the sex of the token's end-user;
a geographical zone where the token's end-user lives (country, city etc.);
the date of birth of the token's end-user;
the place of birth of the token's end-user; etc.

When the token's end-user requests a service S proposed by the service provider server SP via an application, the token D is adapted to receive an end-user's identification request from the service provider server SP, for example via the HTTP protocol ("HyperText Transfer protocol"). After a proper identification, the service provider server SP sends a request RQ1 for opening a SM channel with GAP to the identity provider server IDP. Then, the token D is adapted to receive a request for opening a SM channel via GAP from the identity provider server IDP.

A SM channel will then be open by the identity provider server IDP with the token D, using the GAP, and the token D will use said SM channel to send enciphered info INFO_E to the IDP server. When the SM channel is open, the token D will receive from the service provider server SP the commands related to the service S requested via said SM channel.

As we will see, during the Terminal authentication TA2, some information will be provided to the token which allows the encryption of data that could be used to link an end-user's identity with a secret known by the service provider server SP, but not by the identity provider server IDP. On receiving the result of the authentication operation from the identity provider server IDP, the service provider server SP may then decrypt the data dedicated to it.

To perform the Terminal authentication TA2 of the GAP, the token D will use an authentication public key Kp found in a certificate sent by the IDP server, said certificate being either an identity provider server certificate IDP_CERT (first embodiment Mod1 described later) or a service provider server certificate SP_CERT (second embodiment Mod2 or third embodiment Mod3 described later)

Figure 2:
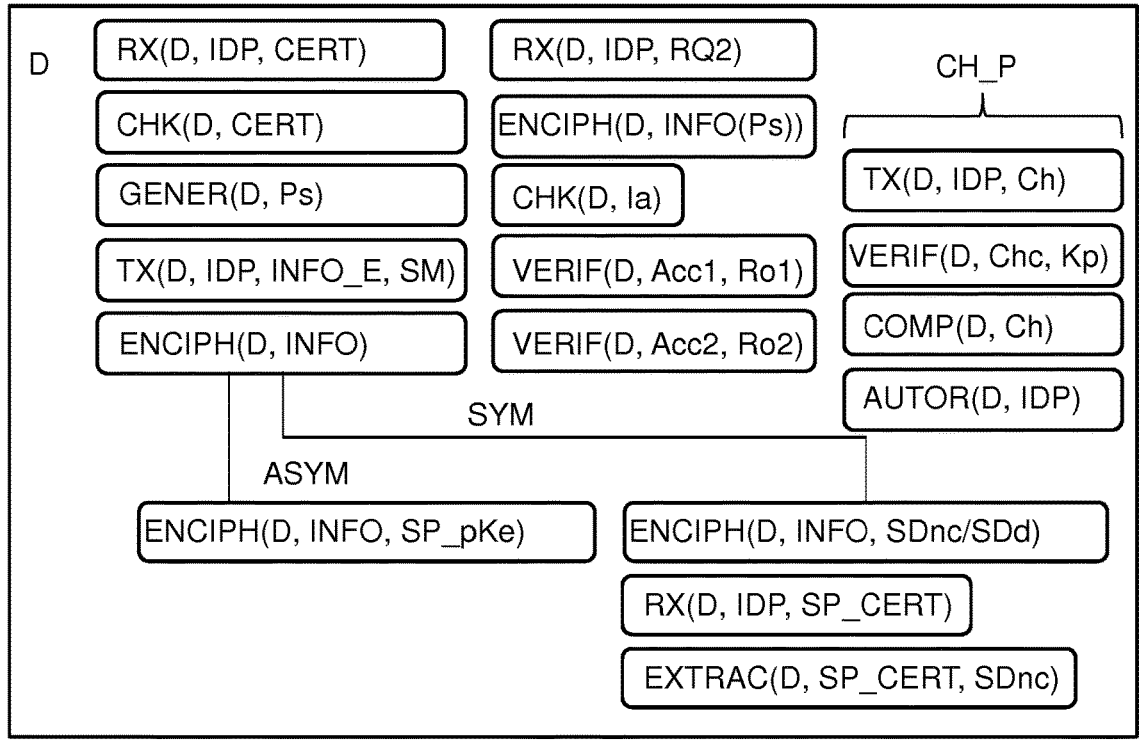
FIG. 2 illustrates schematically a non-limitative embodiment of a token of the security management system of FIG. 1.

Hence, the token D is further adapted to:
send a challenge Ch to said identity provider server IDP upon request (function illustrated in FIG. 2 TX(D, IDP, Ch));
verify with said authentication public key Kp the signed challenge Chc received from said identity provider server IDP (function illustrated in FIG. 2 VERIF(D, Chc, Kp); and
check if it is the same challenge as the one it has sent (function illustrated in FIG. 2 COMP(D, Ch);
if the checking is successful, authorize said identity provider server IDP to communicate with it (function illustrated in FIG. 2 AUTOR(D, IDP)).

For the GAP procedure, said token D is further adapted to:
receive at least one certificate (CERT) from said identity provider server IDP (function illustrated in FIG. 2 RX(D, IDP, CERT));
check the at least one certificate CERT received from said identity provider server IDP (function illustrated in FIG. 2 CHK(D, IDP, CERT)).

Furthermore, said token D is further adapted to:
upon successful checking of said at least one certificate CERT, encipher data INFO (function illustrated in FIG. 2 ENCIPH(D, INFO); and
transmit via a secure messaging channel SM to said identity provider server IDP said enciphered data INFO_E for said service provider server SP (function illustrated in FIG. 2 TX(D, IDP, INFO_E, SM)).

Hence, as the data INFO addressed to the service provider server SP are enciphered, the identity provider server IDP is not able to read said data in said service provider server SP and to use them.

In a non-limitative embodiment, said token D is further adapted to:
generate a pseudonym Ps (function illustrated in FIG. 2 GENER(D, PS)); and
encipher data INFO comprising at least said pseudonym Ps (function illustrated FIG. 2 ENCIPH(D, INFO(Ps)).

Hence, because the pseudonym Ps is enciphered, the identity provider server IDP is not able to recover the different pseudonym associated to a same token D and to perform some pseudonym cross checking. It avoids traceability.

In a non-limitative embodiment, a pseudonym Ps is generated using a standard restricted identification procedure referred as RI procedure. The RI procedure comprises the computation by the token D of a pseudonym Ps based on a sector public key PKsector and on a secret key of the token D.

In another non-limitative embodiment, a pseudonym Ps is generated using a CA3 procedure.

Said RI and CA3 procedures being well-known by the man skilled in the art, they won't be described here.

It is to be noted that the pseudonym Ps depends on a secret key that is managed by the token D and on public information related to the party that will subsequently authenticate the pseudonym, here on a sector public key PKsector of the service provider server SP. Thanks to the pseudonym Ps, a service provider server SP is able to identify the token D by its pseudonym Ps.

Each service provider server SP has its own sector public key PKsector.

The pseudonym Ps is therefore specific to a couple token-service provider server. It means that end-user's activities with different parties, such as different service providers, may not be linked together. It is to be noted that a service provider server is related to a service provider. Therefore, a pseudonym Ps which is specific to a couple token-service provider server means that the pseudonym Ps is specific to a couple token-service provider.

In the case of the TA2-CA2 authentications, there is one pseudonym for a token and the service provider server SP. Therefore, it is always the same in between a service provider server SP and said token D and there is a different pseudonym in between the same service provider server SP and another token D.

In the case of TA2-CA3 authentications, each token has two secret keys which result in two pseudonyms for the couple token-service provider server.

In a non-limitative embodiment, the pseudonym Ps is defined as described in the Technical Guideline BSI-TR-03110—part 2.

A pseudonym Ps being well-known by the man skilled in the art, it won't be further described here.

It is to be noted that the need of a pseudonym Ps is defined by the SP server, which asks it to said IDP server.

Hence, the token D is further adapted to receive from the identity provider server IDP a request RQ2 for a pseudonym (function illustrated in FIG. 2 RX(D, IDP, RQ2)). Said request RQ2 comprises said sector public key PKsector.

In a non-limitative embodiment, the token D is further adapted to receive from the identity provider server IDP a request (not illustrated) for some attributes Att, attributes which are asked and needed by the SP server.

The same request may be used to ask for the pseudonym Ps and the attributes Att.

It is to be noted that when a SM channel is open, first session keys (also called GAP session keys) comprising a first encryption key Kenc1 are generated. It permits to protect the communication between the token D and the identity provider server IDP by encrypting the data with said first encryption key Kenc1.

In a non-limitative embodiment, said first session keys further comprise a first MAC key Kmac1. Hence, in this case, said token D is further adapted to transmit to said identity provider server IDP said enciphered data INFO_E with a first message authentication code MAC1. It permits to ensure integrity of the data transmitted. Said identity provider server IDP will check the integrity on each data exchange with said token D: after each reception of the enciphered data INFO_E, the identity provider server IDP will check the associated MAC1. It ensures that a malware has not modified the enciphered data INFO_E which pass through said SM channel.

Hence, the first session keys Kenc1 and the Kmac1 ensure the protection of the SM channel.

In a non-limitative embodiment, said at least one certificate CERT is a service provider server certificate SP_CERT.

In another non-limitative embodiment, said at least one certificate CERT is an identity provider server certificate IDP_CERT.

In a non-limitative embodiment, the token D is further adapted to check if said identity provider server IDP has the delegation from the service provider server SP (function illustrated in FIG. 2 CHK(D, Ia)). In particular, it will check an information Ia indicating authorization for said identity provider server IDP to perform an authentication on behalf of said service provider server SP. This non-limitative embodiment may be performed when the certificate CERT use for the GAP is the service provider server certificate SP_CERT.

In a non-limitative embodiment, said enciphered data INFO_E comprise token's attributes Att.

In non-limitative embodiments, the enciphering schemes used for enciphering the data INFO are elliptic curves, a PKCS #1, Version 2.1 scheme, a EME-PKCS1-v1_5 scheme, an OAEP ("Optimal Asymmetric Encryption Padding") scheme etc.

In a non-limitative embodiment, the token D is further adapted to encipher the data INFO with an initial vector. It permits the enciphering data INFO_E to be always different for the same data INFO. In this case, the initial vector is defined according to the enciphering scheme used.

As will be described hereinafter, there are two non-limitative embodiments of enciphering data INFO by the token D.

Asymmetric Scheme

In the first non-limitative embodiment an asymmetric scheme ASYM is used:

the enciphering of data INFO by said token D is performed using a public encipher key SP_pKe corresponding to a private encipher key SP_vKe of said service provider server certificate SP_CERT (function illustrated FIG. 2 ENCIPH(D, INFO(Ps), SP_pKe)).

Said public encipher key SP_pKe is passed to the token D via the service provider server certificate SP_CERT. Said encipher key SP_pKe is provided by a second authority A2 in the service provider server certificate SP_CERT. The associated private encipher key SP_vKe is provided by said second authority A2 to the service provider server SP in a secure way. In a non-limitative embodiment, the second authority A2 may be the same than the one A1 which provides the service provider server certificate SP_CERT to the service provider server SP.

Symmetric Scheme

In the second non-limitative embodiment, a symmetric scheme SYM is used.

In this non-limitative embodiment the token D further comprises a secret key SKc.

Said secret key Skc is provided by a second authority A2 to all the tokens D which will cooperate with the IDP. In a non-limitative embodiment, the loading of said secret key Skc is performed during a personalization phase of production of the token D. It could be performed after in a secure way. In a non-limitative embodiment, the second authority A2 may be the same than the one A1 which provides the service provider server certificate SP_CERT to the service provider server SP, but it results in losing the end-user's privacy at the identity provider server IDP level.

The secret key Skc is used to encrypt a first secret data SDnc resulting of a second secret data SDc. The second secret data SDc will be transmitted to the token D by the identity provider server IDP inside the service provider server certificate SP_CERT.

The token D initially has no knowledge of the first secret data SDnc and of the second secret data SDc.

Therefore, in this non-limitative embodiment, when the token D receives the service provider server certificate SP_CERT comprising said second secret data SDc (function illustrated in FIG. 2 RX(D, IDP, CERT), it is further adapted to extract from said service provider server certificate SP_CERT said first secret data SDnc (function illustrated in FIG. 2 EXTRAC(D, SP_CERT, SDnc), said extraction being based on the deciphering of said second secret data SDc using said secret key SKc.

As the first secret data SDnc is unknown to the identity provider server IDP, this latter is not able to decipher the enciphered data INFO_E and therefore doesn't know the contents of the data INFO passing by him.

In non-limitative variants of said second embodiment, the token D is further adapted to encipher the data INFO using, as a ciphering key, said first secret data SDnc or a derived key SDd which computation is based on said first secret data SDnc (function illustrated in FIG. 2 ENCIPH(D, INFO(Pd), SDnc/SDd).

Said derived key SDd is computed according to known derivation schemes.

The derivation scheme used is known by the token D and by the service provider server SP.

In a non-limitative embodiment of said second embodiment, the token D is further adapted to encipher the data INFO with a second message authentication code MAC2. It permits to ensure integrity of the data enciphered. It is to be noted that for said MAC2 a second session key Kmac2 is used, said second session key Kmac2 being computed according to known derivation schemes from said first secret data SDnc. It permits said service provider server SP to check the integrity on each data exchange with said token D. After each deciphering of data INFO_E, the service provider server SP will check the associated MAC2. It ensures that the identity provider server IDP has not modified the enciphered data INFO_E.

In a first non-limitative variant, the service provider server SP computes the second session key Kmac2 from the first secret data SDnc.

In a second non-limitative variant, the service provider server SP receives said second session key Kmac2 from the second authority A2 which provides the first secret data SDnc. This second variant avoids the service provider server SP to perform a computation. It simplifies the task of the service provider server SP, and the second session key Kmac2 is provided with a high security protection.

In non-limitative examples, the following derivation schemes may be used for computing the derived key SDd and for the second session key Kmac2: 2TDES ("Triple Data Encryption Standard"), AES ("Advanced Encryption Standard") using EMAC ("Encryption Based Message authentication"), AES using CMAC ("Cipher Based Message authentication").

Service Provider Server SP

A service provider may own one or a plurality of service provider servers SP. He proposes one or a plurality of service S by means of his server(s) SP.

In a non-limitative variant, the service provider proposes only one service S via its service provider server(s) SP.

In non-limitative examples, a service provider may be a bank, a government, etc.

In non-limitative examples, a service provider may propose as a service S an electronic payment, a banking service, a tax return service, a health service, insurance service, a local government service, a checking personal information service etc.

The service provider server SP is adapted to send a request RQ1 to said identity provider server IDP to open a SM channel via GAP. Said request is sent in a non-limitative embodiment via the HTTP communication protocol.

Figure 3:
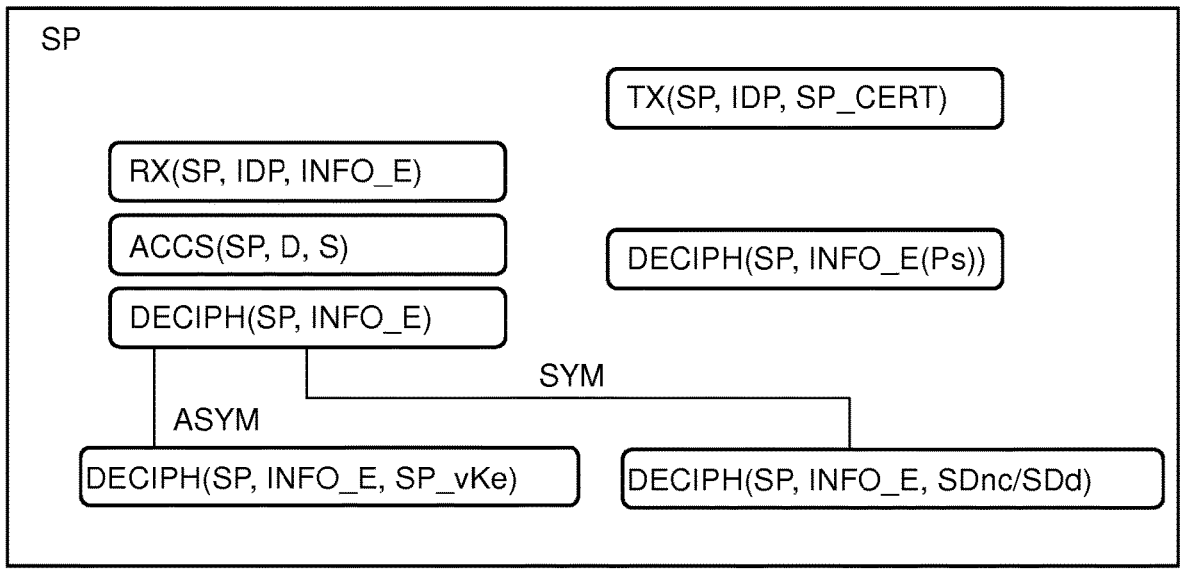
FIG. 3 illustrates schematically a non-limitative embodiment of a service provider server of the security management system of FIG. 1.

In a non-limitative embodiment, said service provider server SP is further adapted to transmit to said identity provider server IDP a service provider server certificate SP_CERT (function illustrated in FIG. 3 TX(SP, IDP, SP_CERT)). In a non-limitative embodiment, the service provider server SP sends to said identity provider server IDP a service provider server certificate SP_CERT with said request RQ1 or independently of said request RQ1, for examples when the contract of service (between said SP server and said IDP server) is set, or on renewable of the service provider server certificate SP_CERT.

A service provider server certificate SP_CERT is the certificate associates to the service provider. Hence, all the servers SP of said service provider will receive the same certificate SP_CERT.

In a non-limitative embodiment, a service provider server certificate SP_CERT comprises:
  access permissions Acc2 and role Ro2 of said service provider server SP; and
  a sector public key PKsector.

In a non-limitative embodiment, said service provider server certificate SP_CERT further comprises the information Ia indicating authorization for said identity provider server IDP to perform an authentication on behalf of said service provider server SP.

In a non-limitative embodiment, said service provider server certificate SP_CERT is provided by a first authority A1 which is different from said identity provider server IDP so that this latter is not able to make the link between all the data INFO sent by a token D. Hence, the identity provider server IDP doesn't know the different keys transmitted by means of the service provider server certificate SP_CERT.

In another non-limitative embodiment, said service provider server certificate SP_CERT is provided by said identity provider server IDP. Here, identity provider server IDP has the knowledge of the different keys transmitted by means of the service provider server certificate SP_CERT.

In a first non-limitative embodiment (Mod2 illustrated in FIG. 1), said service provider server certificate SP_CERT further comprises an authentication public key Kp associated to an authentication private key Ks for use to perform a Terminal authentication TA2. As will be described later, said first non-limitative embodiment will be applied when the identification provider server IDP uses said service provider server certificate SP_CERT for Terminal authentication.

In a second non-limitative embodiment (Mod1 illustrated in FIG. 1), the service provider server certificate SP_CERT doesn't comprise the authentication public key Kp. It will be the identity provider server certificate IDP_CERT which comprises the authentication public key Kp. As will be described later, said second non-limitative embodiment will be applied when the identification provider server IDP uses its own identity provider server certificate IDP_CERT for Terminal authentication TA2.

Said service provider server SP is adapted to:
  receive from said identity provider server IDP enciphered data INFO_E of said token D (function illustrated in FIG. 3 RX(SP, IDP, INFO_E);
  decipher said enciphered data INFO_E to extract said data INFO (function illustrated in FIG. 3 DECIPH(SP, INFO_E).

in a non-limitative embodiment, when a pseudonym Ps is used by the token D, the enciphered info INFO_E comprised said pseudonym Ps as described before, and said service provider server SP is further adapted to:
  decipher said enciphered data INFO_E to extract said pseudonym Ps (function illustrated in FIG. 3 DECIPH (SP, INFO_E(Ps)).

It is to be noted that the service provider server SP is adapted to tell said identity provider server IDP that it needs a pseudonym Ps from the token D.

Said service provider server SP is also adapted to tell the identity provider server IDP that it needs some attributes Att from the token D.

Said service provider server SP is further adapted to give to said token D, or when a pseudonym is used to said pseudonym Ps associated to the token D, access to said service S according to the request of service of the token's end-user (function illustrated in FIG. 3 ACCSS(SP, D, S)).

Asymmetric Scheme

When an asymmetric scheme is used for enciphering the data INFO, said service provider server certificate SP_CERT further comprises a public encipher key SP_pKe, and the service provider server SP is further adapted to decipher said enciphered data INFO_E using a private encipher key SP_vKe corresponding to said public encipher key SP_pKe (function illustrated DECIPH(SP, INFO_E(Ps), SP_vKe)).

Symmetric Scheme

When a symmetric scheme is used for enciphering the data INFO:
- the SP server comprises the first secret data SDnc;
- the service provider server certificate SP_CERT comprises the second secret data SDc which is the result of the ciphering of said first secret data SDn with said secret key SKc.

Said service provider server SP is further adapted to:
- decipher said enciphered data INFO_E (received from said token D via said identity provider IDP) using said first secret data SDnc or said derived key SDd (function illustrated in FIG. 3 DECIPH(SP, INFO_E(Ps), SDnc/SDc)).

It is to be noted that when the derived key SDd is used, as the service provider server SP is aware of the derivation scheme used, it will compute said derived key SDd from the first secret data SDnc, and it will decipher the enciphered data INFO_E with the computed derived key SDd.

In non-limitative embodiments, the derivation scheme to use is defined by an Object Identifier OID which is an extension within the service provider server certificate SP_CERT and exchanged between the token D and the service provider server SP during the GAP to allow each party to know which scheme of derivation to use.

In this embodiment, the secret key Skc is neither known by the SP server nor by the IDP server.

It avoids a malware to recover said secret key Skc and decipher the second secret data Sdc and therefore a malware won't be able to recover the data INFO enciphered by the token D.

It is to be noted that said first secret data SDnc and said second secret data SDc are provided by a second authority A2, of course before cooperating with the identity provider server IDP. It is to be noted that the second authority A2 ciphers the first secret data SDnc with said secret key SKc in order to compute the second secret data SDc, which is inserted in the service provider server certificate SP_CERT.

In a non-limitative embodiment, said first secret data SDnc is transmitted to the SP server in a protected mode. To this end, in a non-limitative embodiment, the https ("hypertext protocol secure") protocol is used.

Identity Provider Server IDP

As described before, the transmission of data through the secure messaging channel SM are encapsulated with a first encryption level with the first session keys Kenc1.

Hence, in order to transmit the data to the service provider server SP, the identity provider server IDP is adapted to first decrypts the data with said session keys Kenc1 (function illustrated in FIG. 3 UNWR(IDP, INFO_E)).

Said identity provider server IDP is adapted to receive from said service provider server SP a request RQ1 to open a SM channel via GAP with said token D.

Figure 4:
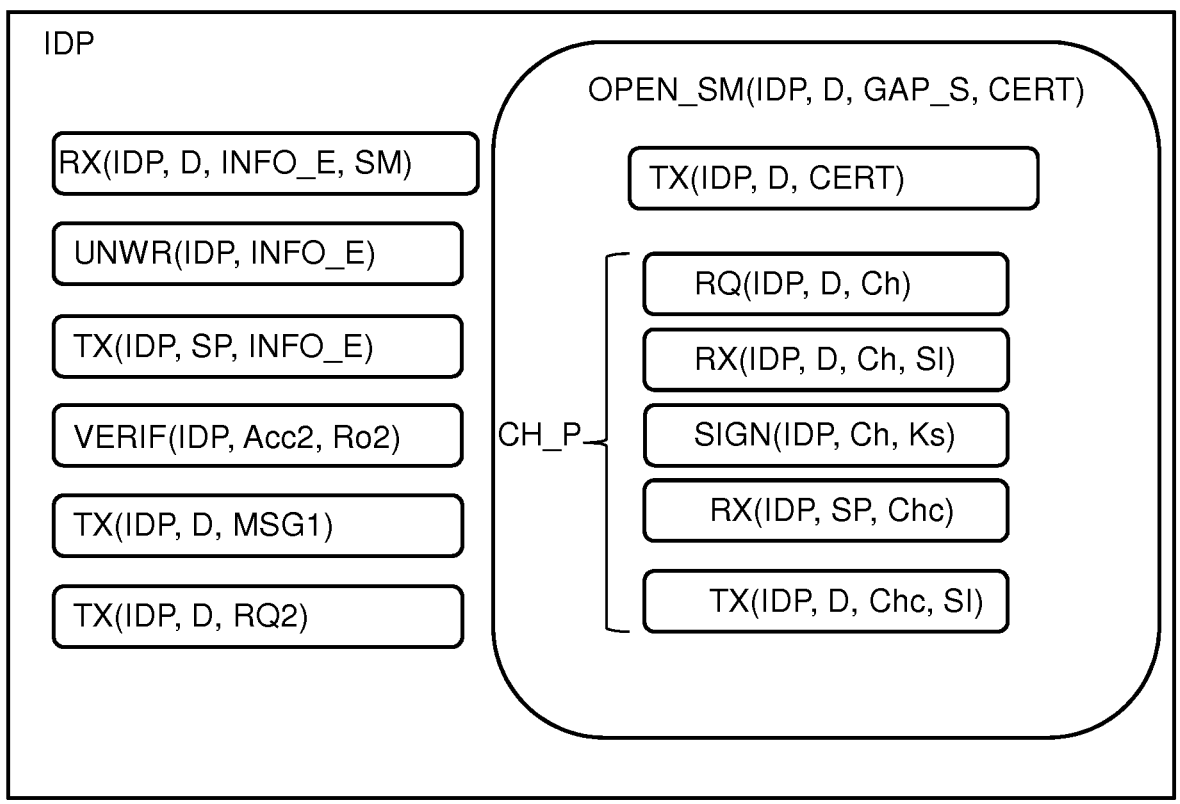
FIG. 4 illustrates schematically a non-limitative embodiment of an identity provider server of the security management system of FIG. 1.

Said identity provider server IDP is adapted to:
- open with said token D a secure messaging channel SM by means of a general authentication procedure GAP using at least one certificate CERT (function illustrated in FIG. 4 OPEN_SM(IDP, D, GAP, CERT)).
- receive via said secure messaging channel SM from said token D enciphered data INFO_E (function illustrated in FIG. 4 RX(IDP, D, INFO_E, SM);
- transmit to said service provider server SP said enciphered data INFO_E (function illustrated in FIG. 4 TX(IDP, SP, INFO_E).

Hence, for opening a SM channel by means of the GAP, the identity provider server IDP performs with the token D the PACE protocol, the Terminal Authentication, and the Chip authentication above-described.

In a non-limitative embodiment, when a pseudonym Ps is used by the token D, the enciphered info INFO_E comprised said pseudonym Ps as described before, said identity provider server IDP is further adapted to receive and transmit enciphered data INFO_E which comprise said pseudonym Ps.

To open said secure messaging channel SM, said identity provider server IDP is further adapted to transmit to said token D said at least one certificate CERT(function illustrated in FIG. 4 TX(IDP, D, CERT)).

In a non-limitative embodiment, said identity provider server IDP is further adapted to send a request RQ2 for a pseudonym Ps to said token D (function illustrated in FIG. 4 TX(IDP, D, RQ2)). The request RQ2 comprises the sector public key PKsector to use for the generation of the pseudonym Ps.

Said IDP server knows the sector public key PKsector as it has access to the service provider server certificate SP_CERT which comprises said sector public key PKsector.

In a non-limitative embodiment, the identity provider server IDP is further adapted to send to said token D a request (not illustrated) for some attributes Att, said attributes Att being asked and needed by the SP server. The same request may be used to ask for the pseudonym Ps and the attributes Att.

When the identity provider server IDP comprises an identity provider server certificate IDP_CERT, said identity provider server certificate IDP_CERT comprises access conditions Acc1 and role Ro1. It is to be noted that the identity provider server certificate IDP_CERT is provided by the first authority A1.

It is to be noted that to open a secure messaging channel SM, a pair of authentication keys Kp-Ks is used, said pair comprising a public key Kp and a private key Ks.

In a first non-limitative embodiment (Mod1), the identity provider server IDP comprises its own authentication private key Ks for use to open said secure messaging channel SM, and more particularly to perform the Terminal authentication TA2. The service provider server SP doesn't comprise any authentication private key Ks. In this case, said identity provider server certificate IDP_CERT further comprises an authentication public key Kp associated to said authentication private key Ks for use to perform a Terminal authentication TA2. The identity provider server certificate IDP_CERT is used for the GAP procedure, whereas the service provider server certificate SP_CERT is only used for the encryption of data INFO as above described.

In a second non-limitative embodiment (Mod2), the identity provider server IDP comprises the authentication private key Ks of the service provider server SP itself for use to open said secure messaging channel SM, and more particularly to perform the Terminal authentication TA2. The corresponding authentication public key Kp is in this case included in the service provider server certificate SP_CERT. The authentication private key Ks is provided by the first authority A1 or to said first authority A1 by the service provider server SP. It is to be noted that in this case, the identity provider server IDP has previously requested said service provider server's authentication private key Ks to the first authority A1.

In a third non-limitative embodiment (Mod3), the identity provider server IDP doesn't comprise any authentication private key Ks for use to open said secure messaging channel SM, and more particularly to perform the Terminal authentication TA2. The authentication private key Ks which is used is the own service provider server's one. The corresponding authentication public key Kp is in this case included in the service provider server certificate SP_CERT.

In the second and the third embodiments (Mod2, Mod3), the service provider server certificate SP_CERT is therefore used for the GAP and for the encryption of data INFO as above described; and the identity provider server IDP has no certificate IDP_CERT.

To perform the Terminal authentication TA2 of the GAP, the identity provider server IDP is further adapted to perform a challenge-response procedure CH_P:
  request a challenge Ch from the token D (function illustrated in FIG. 3 RQ(IDP, D, Ch));
  receive said challenge Ch from said token D (through the encrypted and integrity-secured channel SI) (function illustrated in FIG. 3 RX(IDP, D, Ch, SI));
  a) sign said challenge Ch with the authentication private key Ks (function illustrated in FIG. 3 SIGN(IDP, Ch, Ks):
    i) of its own (first embodiment Mod1); or
    ii) of the service provider server SP (second embodiment Mod2) which it knows; or
  b) ask the service provider server SP to sign said challenge Ch with the authentication private key Ks that said identity provider server IDP doesn't know (third embodiment Mod3) and receive said signed challenge Chc from said service provider server SP (function illustrated in FIG. 3 RX(IDP, SP, Chc);
  after signing said challenge Ch, or receiving said signed challenge Chc, send said signed challenge Chc to said token D (through the encrypted and integrity-secured channel SI) (function illustrated in FIG. 3 TX(IDP, D, Chc, SI)).

It is to be noted that in the case a-ii), the service provider server SP delegates all the Terminal authentication steps to the identity provider server IDP, even the signing of the challenge Ch. In the case b), the service provider server SP keeps its authentication private key Ks secret and performs itself the signing of the challenge Ch.

In a non-limitative embodiment the General Authenticate APDU command may be used, as defined in the Technical Guideline BSI-TR-03110, Part 3.

When the IDP uses the IDP_CERT (Mod1) for opening a SM channel:
  during the Terminal authentication TA2, the token D verifies the access permissions Acc1 and role Ro1 of the identity provider server IDP (function illustrated in FIG. 2 VERIF(D, Acc1, Ro1)); and
  after the GAP procedure, when the SP sends a data request for the token D to said identity provider server IDP:
    the identity provider server IDP verifies the Acc2 and Ro2 and therefore may filter the data request of the SP according to the Acc2 and Ro1 of said SP (function illustrated in FIG. 3 VERIF(IDP, Acc2, Ro2); or
    the token D verifies said Acc2 and Ro2 (function illustrated in FIG. 2 VERIF(D, Acc2, Ro2)).

When the IDP uses the SP_CERT (Mod2, Mod3) for opening a SM channel, during the Terminal authentication TA2, the token D verifies the access permissions Acc1 and role Ro1 of the identity provider server IDP (function illustrated in FIG. 2 VERIF(D, Acc1, Ro1)); and the token D verifies said Acc2 and Ro2 (function illustrated in FIG. 2 VERIF(D, Acc2, Ro2). Hence, when the SM channel has been open, the token D doesn't need to verify said access permissions Acc2 and role Ro2 when receiving a data request from the SP via the IDP.

Figure 5:
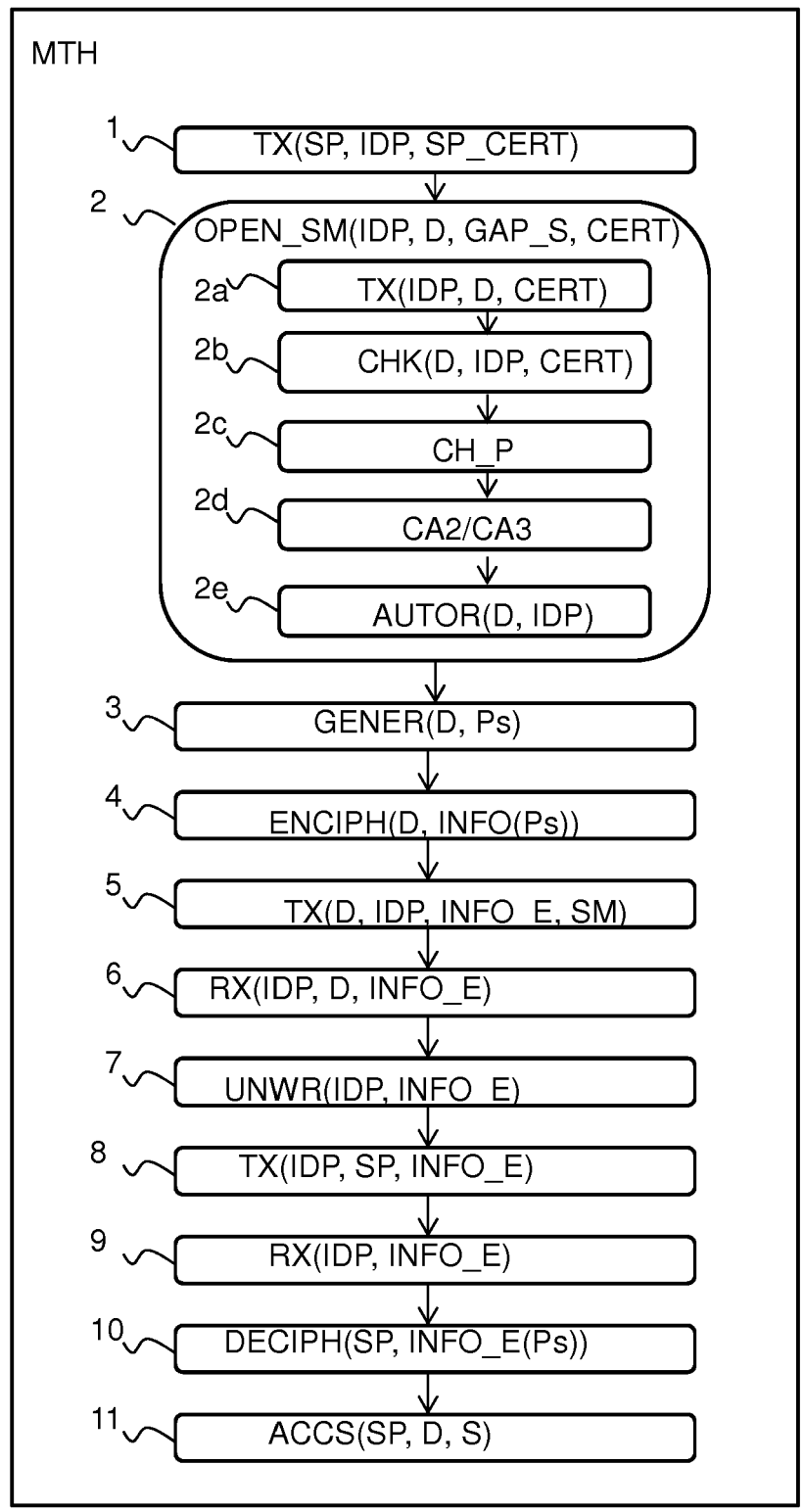
FIG. 5 is a schematic organization chart of a method carried out by the security management system of FIG. 1 according to a non-limitative embodiment.
Figure 6:
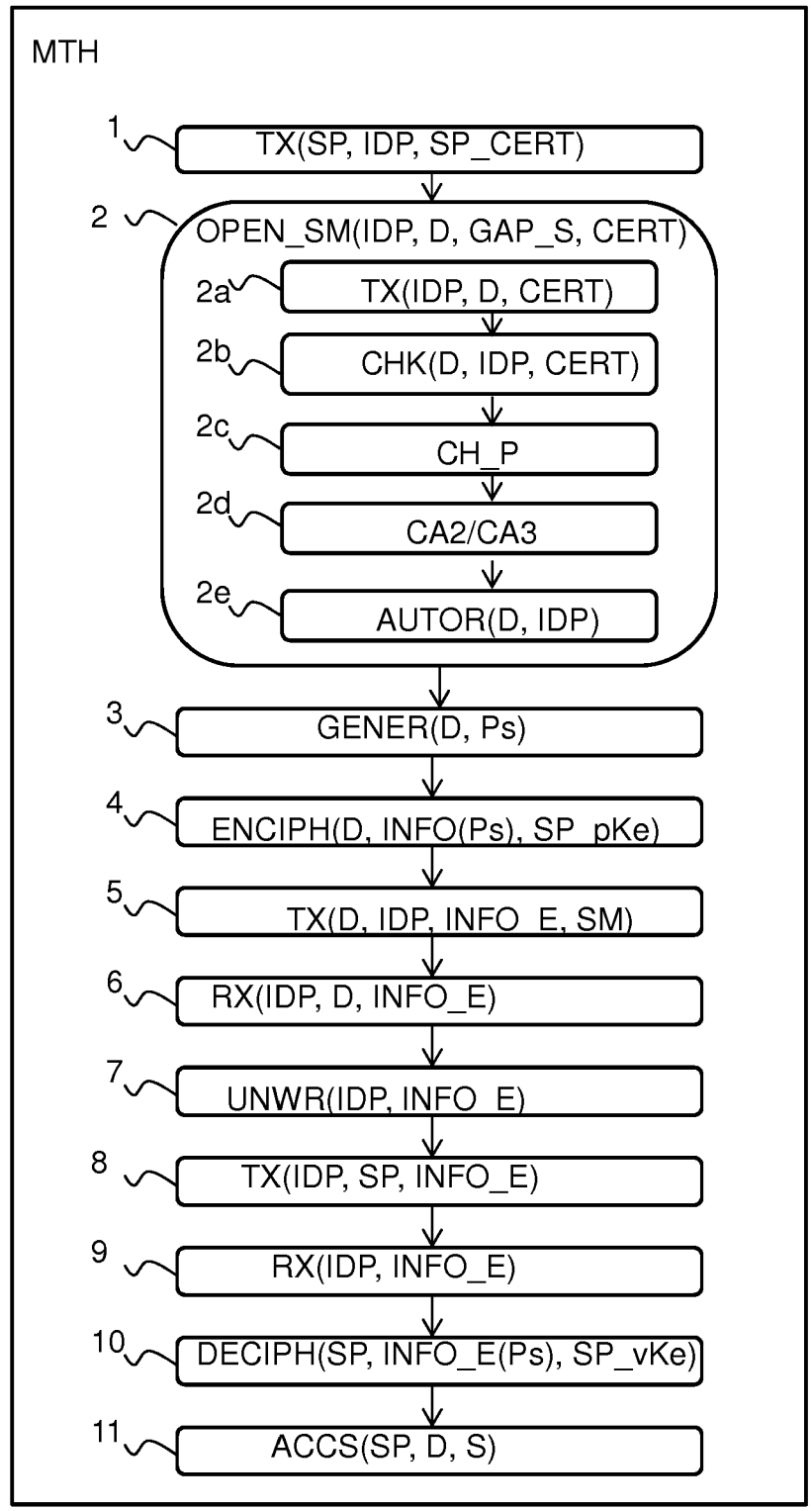
FIG. 6 is a schematic diagram of the method of FIG. 5 according to a first non-limitative embodiment.
Figure 7:
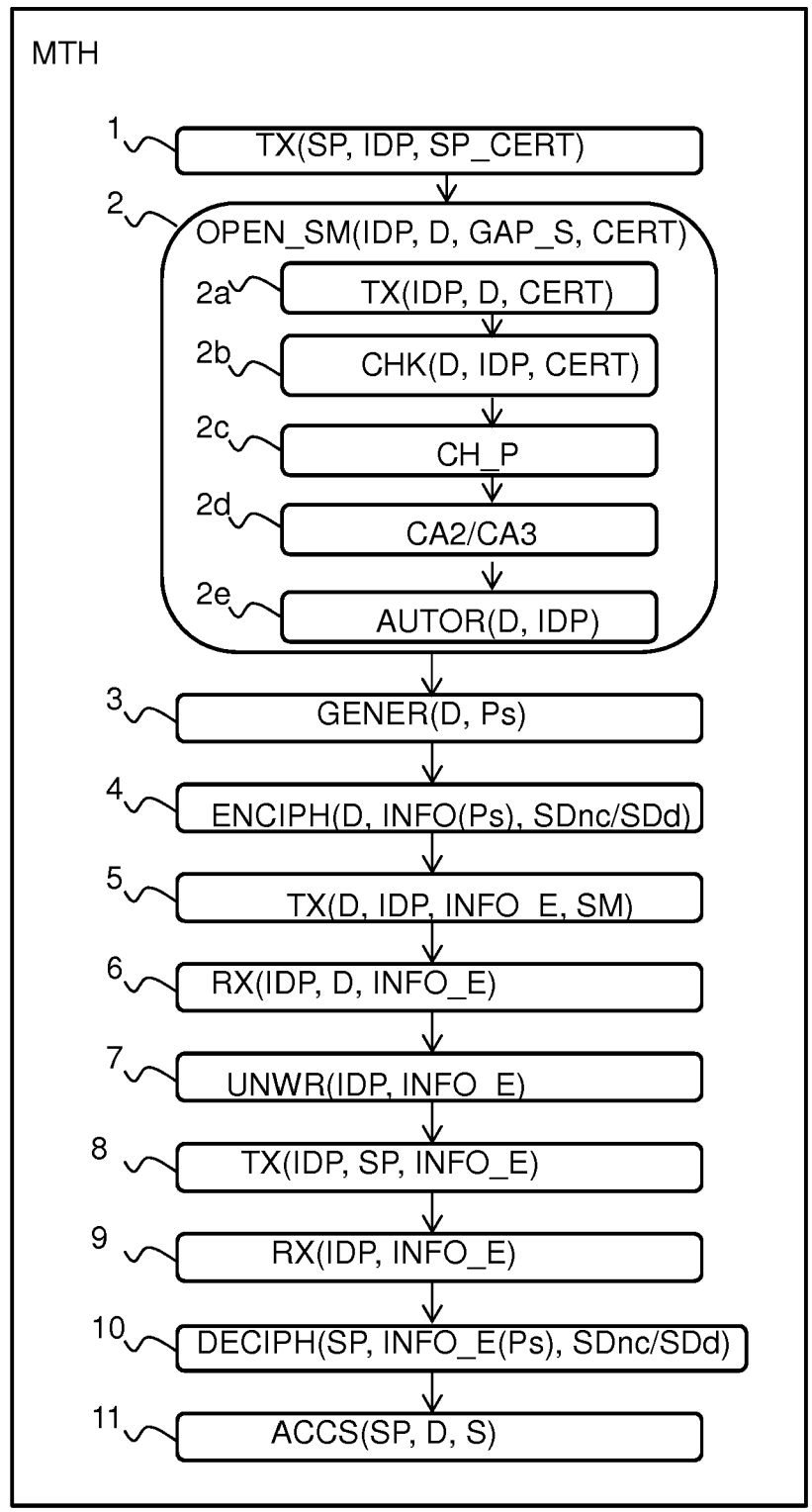
FIG. 7 is a schematic diagram of the method of FIG. 5 according to a second non-limitative embodiment.

Hence, the security management system SYS above-described is adapted to carry out the method MTH for performing a transmission of data INFO from a token D to a service provider server SP by means of an identity provider server IDP. Said method MTH is illustrated in FIGS. 5 to 7 in a non-limitative embodiment.

In this embodiment, a pseudonym Ps is used, and the Chip Authentication CA3, or CA2 is performed.

When the service provider server SP sends a request RQ1 to said identity provider server IDP to open a SM channel with the token D, said service provider server SP transmits to said identity provider server IDP a service provider server certificate SP_CERT in step 1).

In step 2), said identity provider server IDP opens with said token D a secure messaging channel SM by means of a General Authentication Procedure GAP using at least one certificate CERT.

In a non-limitative embodiment (Mod2, Mod3), the identity provider server IDP uses the service provider server certificate SP_CERT to perform said GAP.

In another non-limitative embodiment (Mod1), the identity provider server IDP uses its own identity provider server certificate IDP_CERT to perform said General Authentication Procedure GAP. In this case, the identity provider server IDP doesn't hold private keys that belong to the service provider server SP, such as the authentication private key Ks.

In sub-step 2a), said identity provider server IDP transmits to said token D said at least one certificate CERT.

Hence, said identity provider server IDP transmits said service provider server certificate SP_CERT only (Mod2, Mod3) or both said service provider server certificate SP_CERT and said identity provider server certificate IDP_CERT (Mod1).

By transmitting said service provider server certificate SP_CERT, the identity provider server IDP transmits the access permissions Acc2 and role Ro2 of said service provider server SP and the sector public key PKsector of said service provider server SP.

The service provider server certificate SP_CERT permits the service provider server SP to prove explicit access permission(s) for exactly certain data of said token D.

It is to be reminded that to verify said permission, a CVCA certificate ("Country Verifying Certificate Authority") is stored in the token D with an associated CVCA public key. This CVCA certificate is provided by a certification authority referred as CA. In a not limitative example, said CA authority is the certification authority of a country. This CVCA certificate (and therefore the CVCA public key) is stored at the personalization production phase of said token D.

This certificate is the root of a hierarchy of certificates. All of the certificates which follow in the hierarchy are signed with a private key of their predecessor. The certificate which follows the CVCA certificate is the DVCA certificate ("Document Verifier Certificate Authority"). This DVCA certificate is provided by a certification authority referred as DV. In a not limitative example, said DV authority is the certification authority of the group of banks within the country.

The service provider server certificate SP_CERT is signed with the private key of the predecessor certificate which is the DVCA. The identity provider server certificate IDP_CERT is signed with the private key of the predecessor certificate which is the DVCA. In a not limitative example, the service provider server SP is a server of a service provider who is a bank of the group of banks of the country.

Hence, in addition to the service provider server certificate SP_CERT, the service provider server SP transmits to said identity provider server IDP the DVCA certificate, which transmits in turn said DVCA certificate to the token D. Hence, said token is able to extract from said DVCA certificate the associated DVCA public key.

In sub-step 2b), said token D checks the at least one certificate CERT received from said identity provider server IDP.

For the checking, the token D verifies the authenticity and the integrity of the certificate(s) received. In particular, the token D verifies the signature of all the certificates of the hierarchy beginning by the CVCA certificate. It verifies each signature of the certificates with the public key extracted from the predecessor certificate. The token verifies the signature of the certificate SP_CERT with the public key extracted from the predecessor certificate DVCA. The same applied for the identity provider server certificate IDP_CERT.

In the embodiments (Mod2, Mod3) where the IDP server uses only the service provider server certificate SP_CERT for the GAP, the last certificate CERT to be verified is the service provider server certificate SP_CERT.

In the other embodiment (Mod1) where the IDP server uses its own identity provider server certificate IDP_CERT for the GAP, the last certificate CERT to be verified is both certificates SP_CERT and IDP_CERT.

When the authenticity and integrity of the certificate(s) has been proved, the token D extracts and store in memory the following data:
- the sector public key PKsector and the access permissions Acc2 and role Ro2 from the service provider server certificate SP_CERT; and/or
- the access permissions Acc1 and role Ro1 from the identity provider server certificate IDP_CERT.

Furthermore, the token D extracts and stores in memory the authentication public key Kp:
- from the service provider server certificate SP_CERT (Mod2, Mod3), or
- from the identity provider server certificate IDP_CERT (Mod1).

When the authenticity and integrity of the certificate(s) has been proved, the token D authenticates the service provider server SP.

Hence, In sub-step 2c), the challenge-response procedure (illustrated CH_P) above-described is performed where the token D sends a challenge Ch to the identity provider server IDP upon request, which answers back with an enciphered challenge Chc etc.

It is to be noted that if an information Ia (described before) is used, the token D checks if said identity provider server IDP has the delegation from the service provider server SP. If it is the case, the following steps are performed. If not, the authentication has failed and the transmission of data INFO is not possible.

In sub-step 2d), if the checking is successful, the Chip authentication CA2 or CA3 is performed.

Said Chip authentication is performed by the identity provider server IDP.

If said Chip authentication is successful, the mutual authentication between the token D and the service provider server SP has been successfully executed.

Then, the session keys Kenc1 and Kmac1 above-described are generated, and finally in sub-step 2e), the token D authorizes said identity provider server IDP to communicate with it.

The IDP server will then serves as intermediary means between the SP server and the token D.

When these sub-steps are successfully performed, this means that a secure messaging channel SM is successfully open.

In step 3), said token D generates one pseudonym Ps.

It is to be noted that the SP server has asked said identity provider server IDP for a pseudonym Ps and this latter has asked the token D for a pseudonym Ps using the sector public key PKsector and in a non-limitative embodiment for some attributes Att on behalf of the service provider server SP.

It is to be noted that the pseudonym Ps generation is requested by the SP server either during the request RQ1 (first case), for example for the CA3 procedure, sent to the IDP server, or in a subsequent request (second case) if a pseudonym Ps is needed for a dedicated service for example.

In the second case, in non-limitative examples:
- the RI procedure may be requested after the CA2 to generate a pseudonym PS;
- a PSC procedure (Pseudonym Signature Credentials) may be requested after the CA2 or CA3, a pseudonym Ps and a signature being generated by said token D during said PSC procedure; or
- a PSM procedure (Pseudonym Signature Message) may be requested after the CA2 or CA3, a pseudonym Ps and a signature being generated by said token D during said PSM procedure.

In step 4), said token D enciphers data INFO comprising at least said pseudonym Ps and transmits in step 5) to said identity provider server IDP said enciphered data INFO_E via said secure messaging channel SM.

As described before, the enciphering data INFO_E may comprise one or a plurality of the token's attributes Att.

As described before, the enciphered data INFO_E may also be protecting using a first message authentication code MAC1 to ensure integrity. Therefore, in a non-limitative embodiment (not illustrated), said token D further transmits to said identity provider server IDP said enciphered data INFO_E with a first message authentication code MAC1.

In step 6), said identity provider server IDP receives said enciphered data INFO_E comprising a pseudonym PS from said token D via said secure messaging channel SM.

It then unwraps in step 7) said enciphered data INFO_E with the GAP session keys, in particular with the encryption key Kenc1 described before. "Unwrap" means decryption with a GAP session key. This decryption may further comprises in a further non-limitative embodiment, a MAC checking with a GAP session key Kmac1 described before.

The unwrapping permits the identity provider server IDP to present the enciphered data INFO_E to the service provider server SP.

In step 8), said identity provider server IDP transmits to said service provider server SP said enciphered data INFO_E.

It is to be noted that the transmission between the identity provider server IDP and the service provider server SP should be secured. Any secured communication protocol, such as in a non-limitative example the https protocol ("HyperText Transfer Protocol Secure») may be used. Moreover, said transmission should also ensure message integrity.

In step 8), said service provider server SP receives from said identity provider server IDP said enciphered data INFO_E of said token D.

In step 9), said service provider server SP deciphers said enciphered data INFO_E to extract said pseudonym Ps.

In step 10), said service provider server SP gives to said pseudonym Ps associated to the token D access to said service S according to the request of service of the token's end-user.

For this purpose, the service provider server SP sends via the SM channel the APDU commands necessary to supply said service S.

The method P is performed according to a first and a second non-limitative variants illustrated respectively in FIGS. 6 and 7.

In particular, the enciphering and deciphering are performed according to an asymmetric mechanism (FIG. 6) and to a symmetric mechanism (FIG. 7).

First non-limitative variant.

For this first non-limitative variant illustrated in FIG. 6, said service provider server certificate SP_CERT further comprises a public encipher key SP_pKe.

The steps 1 to 3, and 5 to 9, and 11, and 12 are the same than the ones above-described.

In step 4), the token D enciphers the data INFO using the public encipher key SP_pKe comprised in the service provider server certificate SP_CERT.

In step 10), said service provider server SP deciphers said enciphered data INFO_E using a private encipher key SP_vKe corresponding to said public encipher key SP_pKe.

In a first non-limitative embodiment, the service provider server certificate SP_CERT is specific to one service provider (that means to all the service provider servers SP of said service provider), and the pair of keys private encipher key SP_vKe-public encipher key SP_pKe is specific to one service provider (that means to all the service provider servers SP of said service provider). Therefore there is no link possible between different service providers, as the encrypted data INFO_E will be different in between two service provider servers SP of different service providers. Privacy of the end-user's token is therefore maintained.

In a second non-limitative embodiment, the service provider server certificate SP_CERT is specific to one service provider, but the pair of keys private encipher key SP_vKe-public encipher key SP_pKe is dedicated to all the service providers of a same entity. In this variant, the privacy of the end-user's token is not maintained This first and second embodiments of said first variant may applied for an entity, which is in a non-limitative example, a government of a country which operates a plurality of service providers, and a service provider a ministry of said government, such as the ministry of health, the ministry of agriculture, etc, where each service provider proposes one service S.

Moreover, with this first non-limitative variant, the Chip Authentication is not modified. Only the service provider server SP is replaced with the identity provider server IDP for said Chip Authentication.

Second Non-Limitative Variant.

For this second non-limitative variant illustrated in FIG. 7:
 the token D further comprises a secret key SKc;
 the service provider server SP further comprises a first secret data SDnc and a second secret data SDc which is the result of the ciphering of said first secret data SDn with said secret key SKc;
 the service provider server certificate SP_CERT further comprises said second secret data SDc.

The steps 1 to 3, and 5 to 9, and 11, and 12 are the same than the ones above-described.

Furthermore, when the authenticity and integrity of the certificate(s) has been proved (sub-step 2*b*), the token D further extracts from said service provider server certificate SP_CERT said first secret data SDnc and store it in memory.

The extraction is as following.

In sub-step a), the token D retrieves from the received service provider server certificate SP_CERT the second secret data SDc.

In sub-step b) the token D deciphers said second secret data SDc using said secret key SKc and resulting in the first secret data SDnc.

In step 4), said token D enciphers said data INFO using as a ciphering key said first secret data SDnc or a derived key SDd from said first secret data SDnc.

Hence, the data INFO are returned enciphered to the service provider server SP via the identity provider server IDP so that said identity provider server IDP or any other malware are not able to exploit the data INFO returned by the token D.

In step 10), said service provider server SP deciphers said enciphered data INFO_E using as a deciphering key said first secret data SDnc or said derived key SDd.

In a first non-limitative embodiment, the service provider server certificate SP_CERT is specific to one service provider and that the first secret data SDnc or the derived key SDd is specific to one service provider (that means to all the service provider servers SP of said service provider). Therefore there is no link possible between two service provider servers SP of different service providers, as the encrypted data INFO_E will be different in between two service provider servers SP of different service providers. Privacy of the end-user's token is therefore maintained.

In a second non-limitative embodiment, the service provider server certificate SP_CERT is specific to one service provider, but the first secret data SDnc or the derived key SDd is dedicated to all the service providers of a same entity. In this variant, the privacy of the end-user's token is not maintained.

This first and second embodiments of said second variant may applied for an entity, which is in a non-limitative example, a government of a country which operates a plurality of service providers, and a service provider a ministry of said government, such as the ministry of health, the ministry of agriculture, etc, where each service provider proposes one service S.

Moreover, with this second non-limitative variant, the Chip Authentication is not modified. Only the service provider server SP is replaced with the identity provider server IDP for said Chip Authentication.

It is to be understood that the present invention is not limited to the aforementioned embodiments.

Hence, in a non-limitative embodiment, the security management system SYS may comprise a plurality of identity provider servers IDP.

Hence, some embodiments of the invention may comprise one or a plurality of the following advantages:
 it permits a service provider server to delegate the whole GAP procedure to the identity service provider IDP;
 it maintains the privacy of the end-user of a token;
 the end-users' activities with different parties, such as different service providers, may not be linked together anymore (non-linkability) and their usage may not be traced anymore (non-traceability): their anonymity is maintained;

it avoids a service provider server to perform a Terminal authentication TA2.

The invention claimed is:

1. A security management system for performing a secure transmission of data from a token to a service provider server by means of an identity provider server, wherein said security management system comprises:

said identity provider server (IDP) which is adapted to:
open with said token a secure messaging channel by means of a General Authentication Procedure using at least one certificate;
receive via said secure messaging channel from said token enciphered data including a pseudonym of said token that depends on a secret key of said token and on public information of said service provider wherein the enciphered data is enciphered using a cryptographic key of said service provider; and
transmit to said service provider server said enciphered data;

said service provider server which is adapted to:
receive from said identity provider server enciphered data of said token;
decipher said enciphered data using a deciphering key corresponding to the cryptographic key used to encipher the enciphered data to extract said data including said pseudonym;

said token which is adapted to:
encipher said data including a pseudonym of said token that depends on a secret key of said token and on public information of said service provider wherein the enciphered data is enciphered using a cryptographic key of said service provider; and
transmit via said secure messaging channel to said identity provider server said enciphered data.

2. The security management system according to claim 1, wherein for opening a secure messaging channel:
said identity provider server is further adapted to transmit to said token said at least one certificate; and
said token is further adapted to check said at least one certificate received from said identity provider server.

3. The security management system according to claim 2, wherein said at least one certificate is a service provider server certificate and comprises:
access permissions and role of said service provider server; and a sector public key wherein said public information of said service provider is said sector public key.

4. The security management system according to claim 3, wherein said service provider server certificate further comprises an authentication public key corresponding to an authentication private key for use to perform a Terminal authentication.

5. The security management system according to claim 1, wherein said at least one certificate is an identity provider server certificate and comprises:
access permissions and role of said identity provider server.

6. The security management system according to claim 5, wherein said identity provider server certificate further comprises an authentication public key corresponding to an authentication private key for use to perform a Terminal authentication.

7. The security management system according to claim 1, wherein the enciphering and the deciphering of said data is performed using an asymmetric scheme.

8. The security management system according to the previous claim 7, wherein:
said service provider server certificate further comprises a public encipher key;
the enciphering of data by said token is performed using said public encipher key;
the deciphering of said enciphered data by said service provider server is performed using a private encipher key corresponding to said public encipher key.

9. The security management system according to claim 1, wherein the enciphering and the deciphering of said data is performed using a symmetric scheme.

10. The security management system according to the previous claim 9, wherein:
the token further comprises a secret key;
the service provider server further comprises a first secret data and a second secret data which is the result of the ciphering of said first secret data with said secret key;
the service provider server certificate further comprises said second secret data;
and wherein:
the token is further adapted to extract from said service provider server certificate said first secret data, said extraction being based on the deciphering of said second secret data using said secret key;
the enciphering of data by said token is performed using as a ciphering key said first secret data or a derived key from said first secret data;
the deciphering of said enciphered data by said service provider server is performed using as a deciphering key said first secret data or said derived key.

11. The security management system according to claim 1, wherein said token is a secure element.

12. A method for performing a transmission of data from a token to a service provider server by means of an identity provider server, wherein said method comprises:
opening with said token by means of said identity provider server a secure messaging channel by means of a General Authentication Procedure using at least one certificate;
enciphering, by means of said token, data including a pseudonym of said token that depends on a secret key of said token and on public information of said service provider wherein the enciphered data is enciphered using a cryptographic key of said service provider and transmitting via said secure messaging channel to said identity provider server said enciphered data
receiving from said token via said secure messaging channel by means of said identity provider server said enciphered data;
transmitting to said service provider server by means of said identity provider server said enciphered data;
receiving from said identity provider server by means of said service provider server said enciphered data of said token;
deciphering said enciphered data by means of said service provider server using a deciphering key corresponding to the cryptographic key used to encipher said enciphered data to extract said data including said pseudonym.

* * * * *